(12) United States Patent
Hirose et al.

(10) Patent No.: US 11,884,424 B2
(45) Date of Patent: Jan. 30, 2024

(54) PANEL DEPLOYMENT APPARATUS AND PANEL DEPLOYMENT METHOD

(71) Applicant: NEC CORPORATION, Tokyo (JP)

(72) Inventors: Taichi Hirose, Tokyo (JP); Naoyuki Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 850 days.

(21) Appl. No.: 16/966,722

(22) PCT Filed: Dec. 27, 2018

(86) PCT No.: PCT/JP2018/048263
§ 371 (c)(1),
(2) Date: Jul. 31, 2020

(87) PCT Pub. No.: WO2019/150873
PCT Pub. Date: Aug. 8, 2019

(65) Prior Publication Data
US 2021/0031932 A1 Feb. 4, 2021

(30) Foreign Application Priority Data
Feb. 1, 2018 (JP) .................. 2018-016216

(51) Int. Cl.
*H02S 20/30* (2014.01)
*H02S 30/20* (2014.01)
(Continued)

(52) U.S. Cl.
CPC ............. *B64G 1/222* (2013.01); *H02S 20/30* (2014.12); *H02S 30/00* (2013.01); *H02S 30/20* (2014.12)

(58) Field of Classification Search
CPC .......... H02S 30/20; H02S 30/00; H02S 20/30; B64G 1/44; B64G 1/222; B64G 2700/66
See application file for complete search history.

(56) References Cited

U.S. PATENT DOCUMENTS 5,785,280 A 7/1998 Baghdasarian
5,909,860 A 6/1999 Lee
(Continued)

FOREIGN PATENT DOCUMENTS

| JP | 63-232099 A | 9/1988 |
|----|-------------|--------|
| JP | 2001-048099 A | 2/2001 |
| JP | 2005-178773 A | 7/2005 |

OTHER PUBLICATIONS

International Search Report for PCT/JP2018/048263, dated Mar. 26, 2019.
(Continued)

*Primary Examiner* — Jayne L Mershon
(74) *Attorney, Agent, or Firm* — Sughrue Mion, PLLC

(57) ABSTRACT

A panel deployment apparatus includes a guide provided on a first hinge axis of a main hinge; a guide provided on a second hinge axis of a side hinge; and a deployment stop arm that stops deployment of a second side panel by sequential engagement with the guide and the guide, the deployment stop arm being fixed to the second side panel, wherein the second main panel is deployed in a state of the deployment stop arm being engaged with the guide and, when the deployment stop arm is disengaged from the guide and then engaged with the guide, the first side panel is deployed in a state of the deployment stop arm being engaged with the guide and, when the deployment stop arm is disengaged from the guide, the second side panel is deployed.

9 Claims, 14 Drawing Sheets

(51) Int. Cl.
*B64G 1/22* (2006.01)
*H02S 30/00* (2014.01)

(56) References Cited

U.S. PATENT DOCUMENTS

| | | | | |
|---|---|---|---|---|
| 6,010,096 A | * | 1/2000 | Baghdasarian | B64G 1/443 244/172.6 |
| 8,915,474 B1 | * | 12/2014 | Baghdasarian | B64G 1/222 52/173.3 |
| 2017/0063296 A1 | * | 3/2017 | Cruijssen | B64G 1/443 |

OTHER PUBLICATIONS

Extended European Search Report for EP Application No. 18903536.3 dated Mar. 2, 2021.

* cited by examiner

PANEL DEPLOYMENT APPARATUS AND PANEL DEPLOYMENT METHOD

CROSS REFERENCE TO RELATED APPLICATIONS

This application is a National Stage of International Application No. PCT/JP2018/048263 filed Dec. 27, 2018, claiming priority based on Japanese Patent Application No. 2018-016216 filed Feb. 1, 2018.

TECHNICAL FIELD

The present invention relates to a panel deployment apparatus and method used for a deployable structure such as a solar cell paddle and a large-sized antenna.

BACKGROUND

There have been proposed several structures capable of sequentially deploying a deployable structure composed of main panels and side panels. For instance, according to a deployment mechanism disclosed in Patent Literature 1, a main panel and a side panel are coupled by a hinge having a latching mechanism and, when the main panel is fully deployed, the latch of the hinge is released to start the deployment of the side panel. Accordingly, multiple main panels are sequentially deployed from the panel stack, causing sequential deployment of the side panels in the order of full deployment of their associated main panels.

Further, according to a deployment mechanism disclosed in Patent Literature 2, side panels are deployable on both sides of the main panel and are stowed over their associated main panels. After a main panel has been deployed, one side panel of the main panel is deployed, which disengages the latch of the other side panel to start the deployment thereof.

BACKGROUND ART LITERATURE

Patent Literature

[PTL 1] U.S. Pat. No. 5,909,860
[PTL 2] U.S. Pat. No. 6,010,096

SUMMARY

Technical Problem

The deployment mechanisms disclosed in the above-mentioned patent literatures employ a structure that interlocks with a panel deployment latch mechanism in order to realize sequential side panel deployment, resulting in complicated latch mechanism of the hinge and increase in space and mass. Also, the side panel deployment does not start until the main panel or the preceding side panel is deployed and then latched, thereby making it unable to adjust the start timing of panel deployment. Further, the deployment mechanism disclosed in the patent literatures cannot deploy the side panels sequentially in one direction. Furthermore, since the deployment of the main panels and the deployment of the side panels are not separated, the deployment of the side panels cannot be sequentially controlled. Further, without employing the interlock mechanism, the deployment behavior may be unstable, making an excessive impact at the time of deployment latch.

An object of the present invention is to provide a panel deployment apparatus and a panel deployment method which can achieve the improved degree of freedom in the start timing of panel deployment without complicating the hinge structure and can implement sequential deployment of side panels separated from the deployment of main panels.

Solution to Problem

According to an aspect of the present invention, a panel deployment apparatus that sequentially deploys a plurality of panels arranged in a stacked state before deployment, includes: a main hinge that couples a first main panel and a second main panel such that they are deployable about a first hinge axis; a first side hinge that couples the first main panel and a first side panel such that they are deployable about a second hinge axis orthogonal to the first hinge axis; a second side hinge that couples the second main panel and a second side panel such that they are deployable about a third hinge axis opposite to the first side hinge; a first guide means provided on the first hinge axis of the main hinge, the first guide means being fixed to the first main panel; a second guide means provided on the second hinge axis of the side hinge, the second guide means being fixed to the first side panel; and a deployment stop means that stops deployment of the second side panel by sequential engagement with the first guide means and the second guide means, the deployment stop means being fixed to the second side panel, wherein the second main panel and the second side panel are deployed in a state of the deployment stop means being engaged with the first guide means and, when the deployment stop means is disengaged from the first guide means, the second side panel is deployed with respect to the second main panel.

According to another aspect of the present invention, a panel deployment method for sequentially deploying a plurality of panels arranged in a stacked state before deployment in a panel deployment apparatus including: a main hinge that couples a first main panel and a second main panel such that they are deployable about a first hinge axis; a first side hinge that couples the first main panel and a first side panel such that they are deployable about a second hinge axis orthogonal to the first hinge axis; a second side hinge that couples the second main panel and a second side panel such that they are deployable about a third hinge axis opposite to the first side hinge; a first guide means provided on the first hinge axis of the main hinge, the first guide means being fixed to the first main panel; a second guide means provided on the second hinge axis of the side hinge, the second guide means being fixed to the first side panel; and a deployment stop means that stops deployment of the second side panel by sequential engagement with the first guide means and the second guide means, the deployment stop means being fixed to the second side panel, the panel deployment method comprising: deploying the second main panel by rotation of the main hinge in a state of the deployment stop means being engaged with the first guide means; when the second main panel is deployed, disengaging the deployment stop means from the first guide means, engaging the deployment stop means with the second guide means, thereby maintaining a stop state of deployment of the second side panel with respect to the second main panel, when deploying the first side panel by rotation of the first side hinge in a state of the deployment stop means being engaged with the second guide means, disengaging the deployment stop means from the second guide means, causing the second side panel to be deployed with respect to the second main panel.

According to the present invention, it is possible to improve the degree of freedom in the start timing of panel deployment and implement the sequential deployment of side panels separated from the deployment of the main panels without complicating the hinge structure.

DETAILED DESCRIPTION

Outline of Exemplary Embodiments

According to an exemplary embodiment of the present invention, guides provided on two orthogonal hinge axes and a stop arm designed to abut these guides are provided separately from the latch mechanism. The stop arm uses the rotation of a hinge deploying the preceding main panel or side panel to sequentially engage two guides on different hinge axes, thereby suppressing the deployment of a side panel that should be finally deployed. The stop arm is disengaged from all the guides, triggering the deployment of the side panel to be finally deployed. With this structure, it is possible to separate the main panel deployment and the side panel deployment and to sequentially control the side panel deployment without providing a complicated synchronization mechanism. The stop arm can be constructed with hooks that can be engaged with the guides, allowing a simple deployment-stopping mechanism to perform sequential deployment control of the side panels.

Hereinafter, an exemplary embodiment of the present invention will be described in detail with reference to the drawings. FIGS. 1-14 are illustrated for explaining the structure and operation of the panel deployment apparatus according to the exemplary embodiment of the present invention, but not showing the actual shapes, dimensions, and dimensional ratios of each of components.

1. Schematic Structure

There will be described hereinafter as an example the case where the panels are sequentially deployed by the stop arm from the state where panels are stacked according to the present embodiment. Four panels have the same rectangular shape and are composed of two main panels and two side panels coupled respectively to the main panels.

Figure 1:
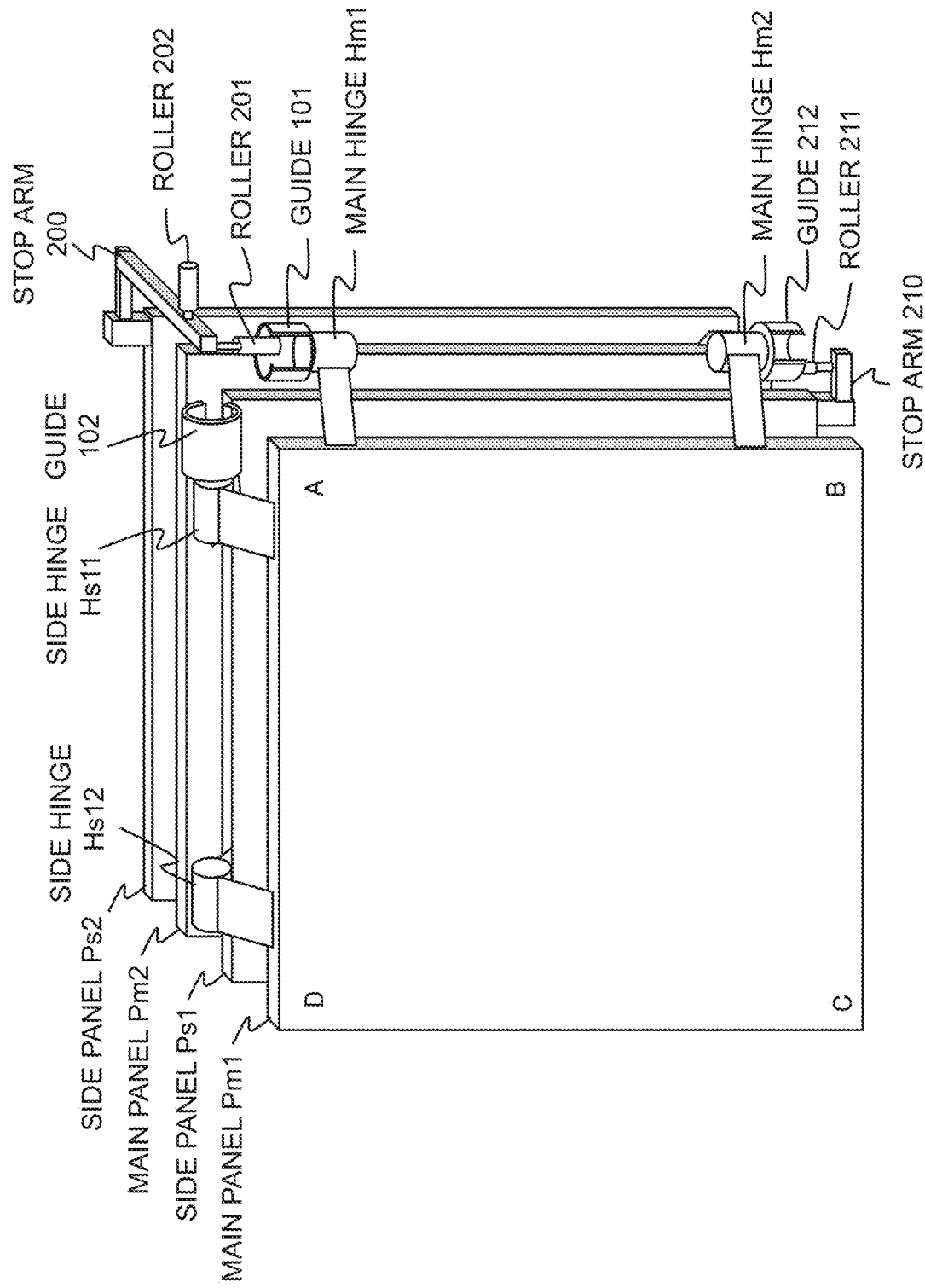
FIG. 1 is a perspective view showing a schematic structure of a panel deployment apparatus according to an exemplary embodiment of the present invention.

As illustrated in FIG. 1, in a panel stack including a main panel Pm1, a side panel Ps1, a main panel Pm2, and a side panel Ps2, the first side of each panel is indicated by AB, the second side by AD, and the third side by BC. The first side AB and the second side AD are orthogonal to each other, and the third side BC is a parallel side facing the second side AD. Note that this notation is merely a name for convenience, and does not limit the shape of the present embodiment.

In FIG. 1, the main panel Pm1 and the main panel Pm2 are rotatably coupled by main hinges Hm1 and Hm2 provided on the first side AB side. Further, the main panel Pm1 and the side panel Ps1 are rotatably coupled by side hinges Hs11 and Hs12 provided on the second side AD side. Further, the main panel Pm2 and the side panel Ps2 have side hinges Hs21 and Hs22 provided on the third side BC side (these are hidden in FIG. 1 but in FIGS. 3 and 4. Both the main hinges and the side hinges are activated in the developing direction.

The panel deployment apparatus according to the present exemplary embodiment includes a guide 101 provided on the main hinge Hm1, a guide 102 provided on the side hinge Hs11, and rollers 201 and 201 provided on a stop arm 200 fixed to the side panel Ps2. The panel deployment apparatus is collectively arranged in the vicinity of the panel corner portion A as shown in FIG. 1. Further, a guide 212 is provided on the main hinge Hm2, and a roller 211 is provided on the stop arm 210 fixed to the side panel Ps1. The detailed structure of the panel deployment apparatus will be described later.

According to the present exemplary embodiment, the roller 201 moves in engagement with the guide 101 as the main hinge Hm1 rotates, and the roller 211 also moves in engagement with the guide 212 as the main hinge Hm2 rotates. When the roller 201 is disengaged from the guide 101, the roller 202 is engaged with the guide 102, thereby still preventing the side panel Ps2 fixed to the stop arm 200 from starting deployment. Further, as long as the roller 211 is engaged with the guide 212, the side panel Ps1 cannot start development. The roller 211 is disengaged from the guide 212 when the roller 202 is engaged with the guide 102, so that the side panel Ps1 starts to deploy about the side hinges Hs11 and Hs12. When the side panel Ps1 starts to deploy in accordance with the rotation of the side hinge Hs11, the guide 102 rotates with respect to the roller 202, and the roller 202 disengages from the guide 102 in a desired deployment state, thereby starting the development of the final side panel Ps2. In this manner, the operations by a combination of the guides 101 and 102 and the rollers 201 and 202 according to the hinge rotations allow sequential control of the main panel deployment and the side panel deployment as shown in FIG. 2.

Figure 2:
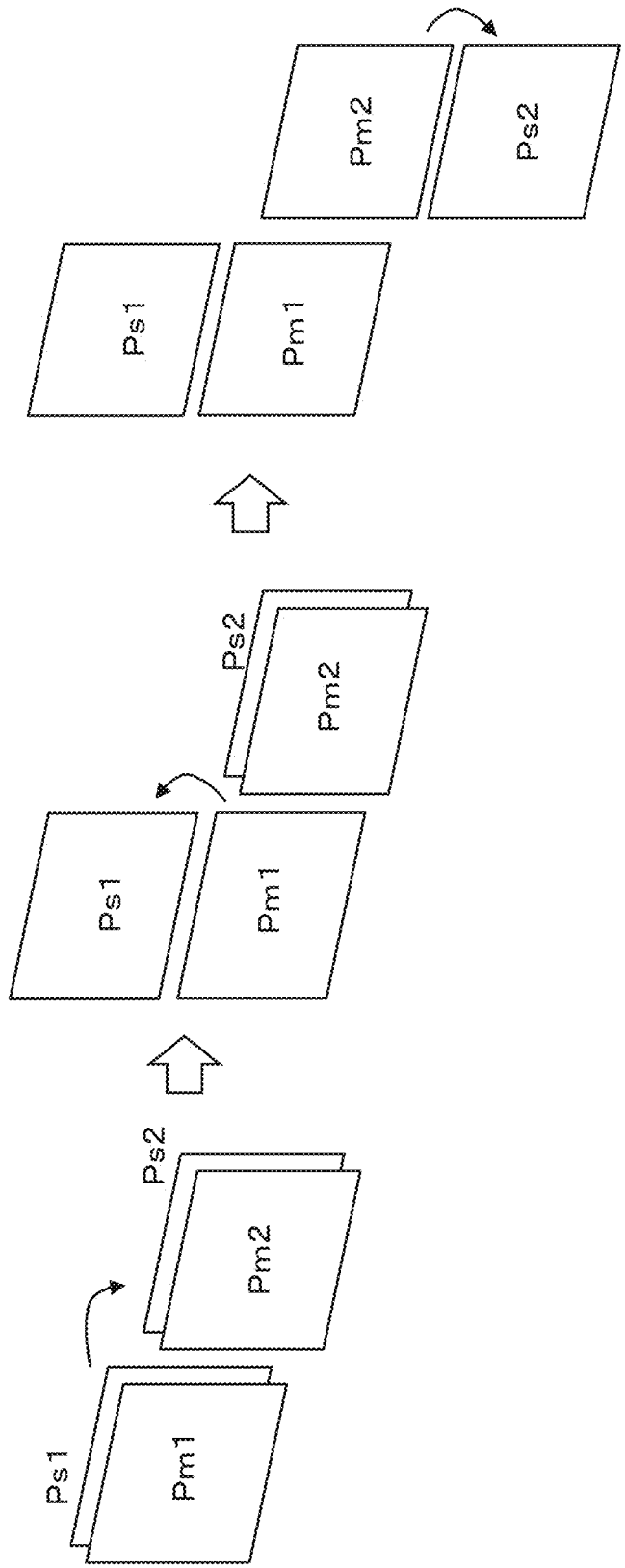
FIG. 2 is a diagram showing an example of a panel deployment operation of the panel deployment apparatus according to the present embodiment.

Referring to FIG. 2, a panel deployment sequence according to the present embodiment is performed as follows: the main panels Pm1 and Pm2 are deployed together with their respective side panels, whereby the roller 201 is disengaged from the guide 101 and the roller 202 is engaged with the guide 102; subsequently, when the main panel Pm2 is deployed, the roller 211 is disengaged from the guide 212, starting the deployment of the side panel Ps1. When the side panel Ps1 is deployed, the roller 202 is disengaged from the guide 102, deploying the side panel Ps2. Hereinafter, referring to FIGS. 3-13, the deployment mechanism and the operation of the present exemplary embodiment will be described below.

2. Panel Deployment Apparatus

Figure 3:
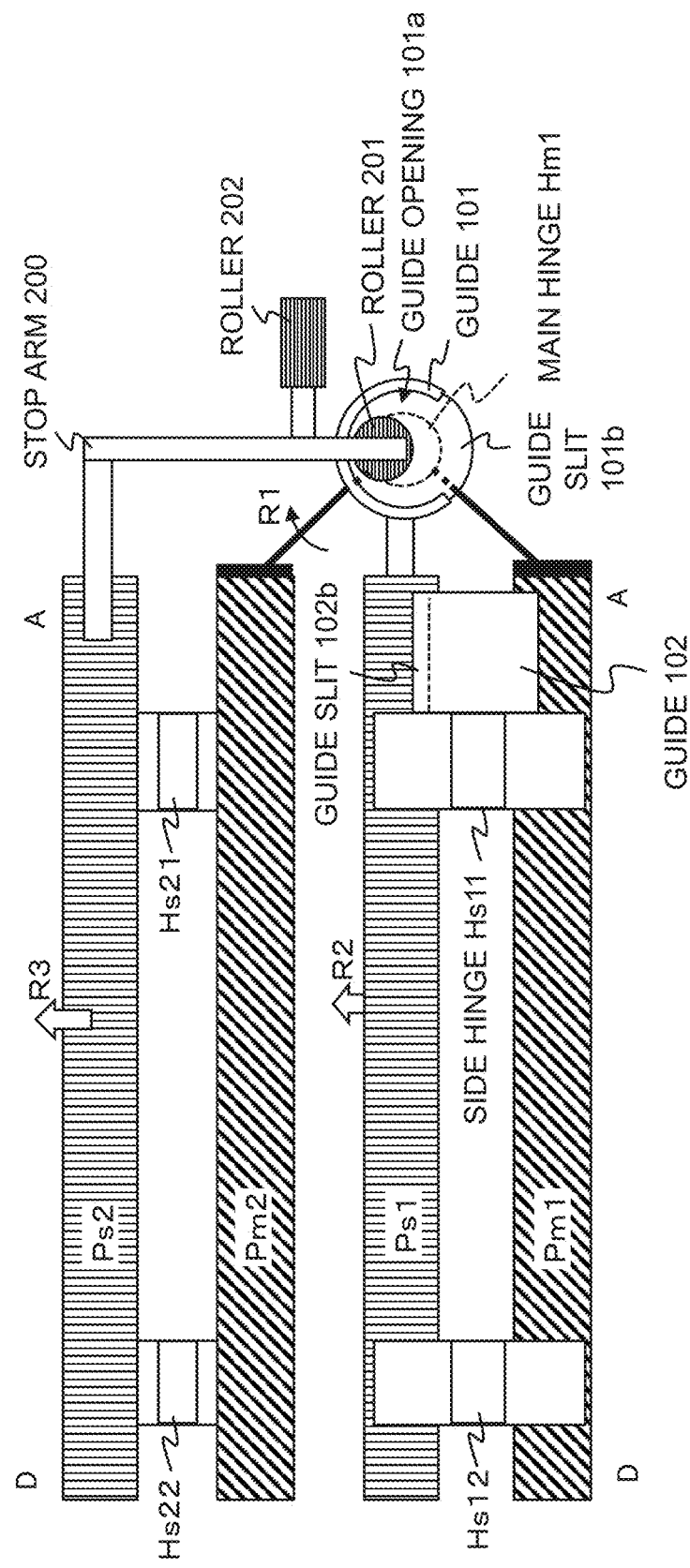
FIG. 3 is a schematic plan view of the panel deployment apparatus shown in FIG. 1.

In FIG. 3, the main hinge Hm1 is urged in a deployment direction R1, and the guide 101 of cylindrical shape is fixed to the arm of the hinge shaft portion on the side of the main panel Pm1. The guide 101 has a guide opening 101a on the upper part thereof, and a guide slit 101b having a predetermined width is formed in a predetermined portion on the side surface of the guide 101.

The stop arm 200 is fixed to the corner portion A of the side panel Ps2, extending from the corner portion A to the guide 101. A roller 201 is provided at the tip of the stop arm 200 on a stop axis extending from the tip to the guide 101 in the direction of the first side AB. The roller 202 is provided behind the roller 201 of the stop arm 200 on a stop axis extending in the direction of the second side AD orthogonal to the roller 201. The roller 201 is arranged so as to come into contact with the guide 101 through the guide opening 101a. The positional relationship between the roller 202 and the guide 102 will be described later (see FIGS. 4 and 7).

Figure 4:
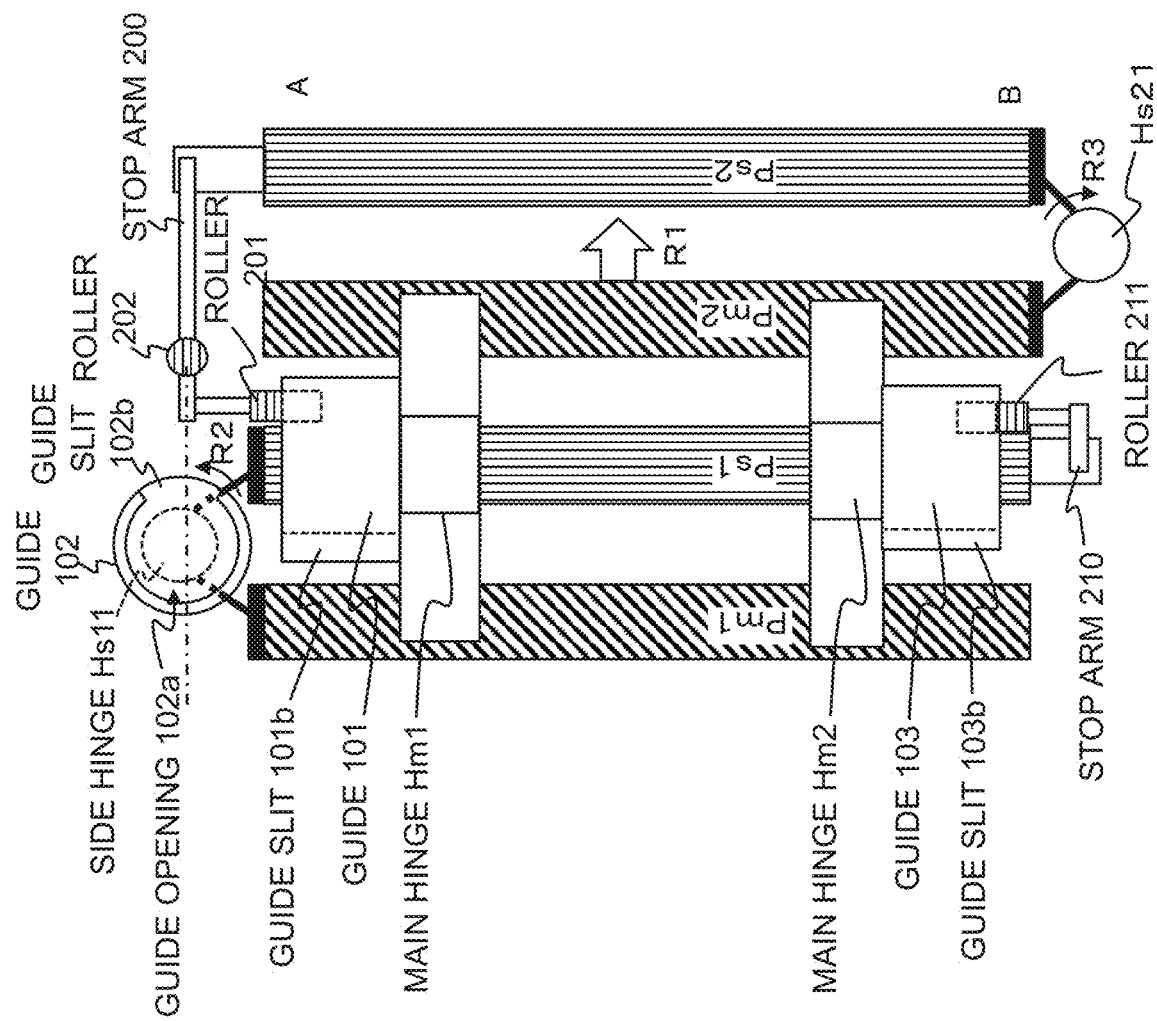
FIG. 4 is a schematic side view of the panel deployment apparatus shown in FIG. 1.

In FIG. 4, the side hinge Hs11 is urged in the developing direction R2, and the guide 102 of cylindrical shape is fixed to the arm of the hinge shaft portion on the side of the side panel Ps1. The guide 102 has a guide opening 102a on the upper part thereof, and a guide slit 102b having a predetermined width is formed on a predetermined portion on the side surface of the guide 102. The stop arm 200 is installed so that the roller 202 is substantially level with the center of the guide 102. Further, the guide 103 of cylindrical shape is fixed to the arm of the hinge shaft portion of the main hinge Hm2 on the side of the main panel Pm2. The guide 103 has a guide opening on the upper portion (lower side in the drawing), and a guide slit 103b having a predetermined width is formed on a predetermined portion of the side surface of the guide 103. The stop arm 210 is arranged so that the roller 211 is engaged with the guide 103. The guide slit 103b is formed to have a width allowing the roller 211 to pass therethrough.

As typically shown in FIG. 4, the side panel Ps1 is urged by the side hinges Hs11 and Hs12 in the developing direction (indicated by arrow R2) with respect to the main panel Pm1. However, even if the main panel Pm2 is deployed, the deployment of the side panel Ps1 is locked as long as the guide 103 of the main hinge Hm2 is engaged with the roller 211. Further, the side panel Ps2 is urged by the side hinges Hs21 and Hs22 in the developing direction (indicated by arrow R3) with respect to the main panel Pm2. However, as long as the roller 201 is engaged with the guide 101, the stop arm 200 locks the deployment of the side panel Ps2. Since the guide slit 103b is formed at a predetermined position of the guide 103, when the guide 103 rotates by a predetermined angle, the roller 211 reaches the guide slit 103b and is disengaged from the guide 103. Similarly, since the guide slit 101b is formed at a predetermined position of the guide 101, when the guide 101 rotates by a predetermined angle, the roller 201 is disengaged from the guide 101 when it reaches the guide slit 101b. At the same time, the roller 202 comes into contact with the guide 102 to continuously stop the development of the side panel Ps2.

Figure 5:
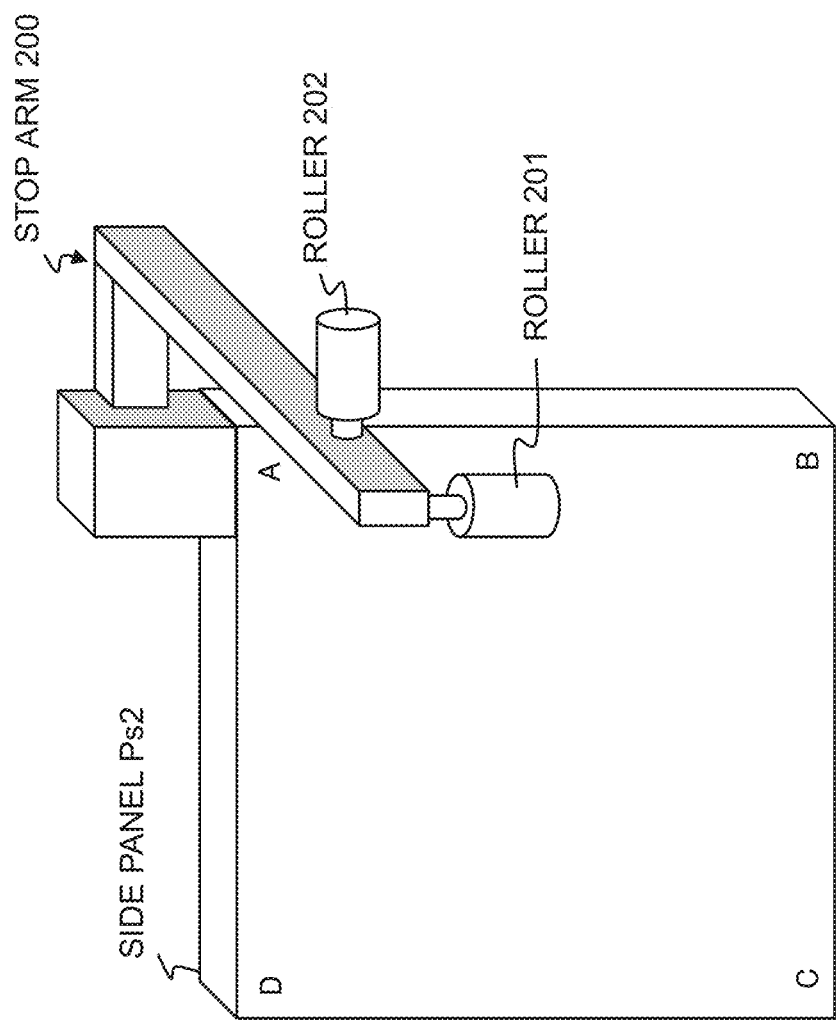
FIG. 5 is a perspective view showing an example of a stop arm in the panel deployment apparatus shown in FIG. 1.

As illustrated in FIG. 5, the rollers 201 and 202 of the stop arm 200 are positioned so that they are engaged with the guides 101 and 102, respectively. The shape of the stop arm 200 is not limited to that illustrated in FIG. 5. Any shape can be adopted so that the stop arm 200 functions as the deployment stop means as described above. Further, considering that two stop members extending from the stop arm 200 in two axial directions come into contact with and move on the respective inner surfaces of the side walls of the guides 101 and 102, it is preferable to adopt the rollers 201 and 202 as the two stop members.

<Hinge with Guide>

As described above, the main hinges and the side hinges in the present embodiment have the same structure with respect to hinge mechanism, but only the main hinges Hm1, Hm2 and the side hinge Hs11 is additionally provided with the guides 101, 102 and 103, respectively. Hereinafter, the structure of the main hinges Hm1 and Hm2 and the side hinge Hs11 will be described with reference to FIG. 6. However, since the main hinges Hm1 and Hm2 and the side hinge Hs11 have basically the same structure, each of them is referred to as a hinge 300.

Figure 6:
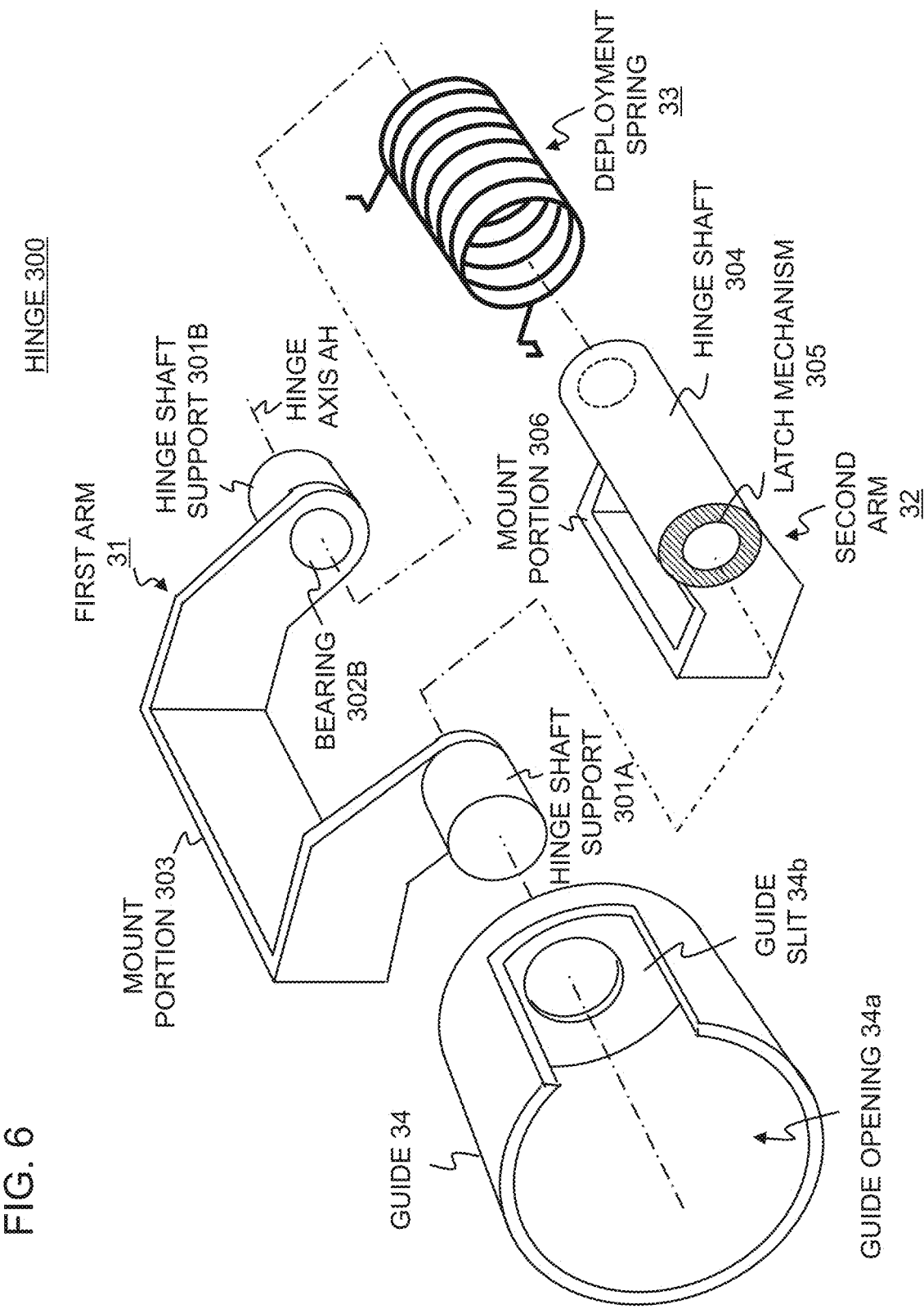
FIG. 6 is an exploded perspective view showing a schematic structure of a hinge with guide used in this embodiment.

In FIG. 6, the hinge 300 includes a first arm 31, a second arm 32, a deployment spring 33 and a guide 34. The guide 34 corresponds to the guides 101 and 102 in this embodiment.

The first arm 31 is a U-shaped arm, and is provided with a pair of hinge shaft supports 301A and 301B at both ends of the arm along the hinge axis AH, and is further provided with bearing portions 302A and 302B in respective hinge shaft supports. In this example, the guide 34 of cylindrical shape is attached to the hinge shaft support 301A. The first arm 31 is provided with a mount portion 303 for fixing the deployment structure (one panel).

The second arm 32 is a U-shaped arm and is provided with one hinge shaft 304 fixed to both ends of the arm along the hinge axis AH. The hinge shaft 304 is provided with a predetermined latch mechanism 305 therein for holding the deployed position. As the latch mechanism 305, any mechanism can be adopted depending on the material of the deployment structure, the environment of use and others. Accordingly, details of the latch mechanism 305 are omitted. The second arm 32 is provided with a mount portion 306 for fixing a deployment structure (a panel different from the panel of the mount portion 303). It is assumed that the deployment spring 33 urges the first arm 31 and the second arm 32 in the deployment direction by hooking both ends thereof on the first arm 31 and the second arm 32, respectively.

The guide 34 has a guide opening 34a on the upper portion thereof, and a guide slit 34b is formed in a part of the side wall thereof. The position and width of the guide slit 34b vary depending on which is the guide 34: the guide 101 or the guide 102 described above. Further in this embodiment the guide 34 is fixed to the first arm 31 by a fixing means such as screwing. In the case where the guide 34 is fixed to the first arm 31, the guide 34 rotates together with the first arm 31, so that the guide 34 is relatively stationary with respect to the first arm 31 and rotates with respect to the second arm 32. Accordingly, by selecting panels to be attached respectively to the first arm 31 and the second arm 32, the hinge 300 can be used as the main hinge Hm1 or the side hinge Hs11 in the present embodiment. For example, since the guide 101 is fixed to the arm on the main panel Pm1 side, when it is used as the main hinge Hm1, the main panel Pm1 is fixed to the mount portion 303 of the first arm 31 and the main panel Pm2 is fixed to the mount portion 306 of the second arm 32.

<Arrangement of Roller and Guide>

Figure 7:
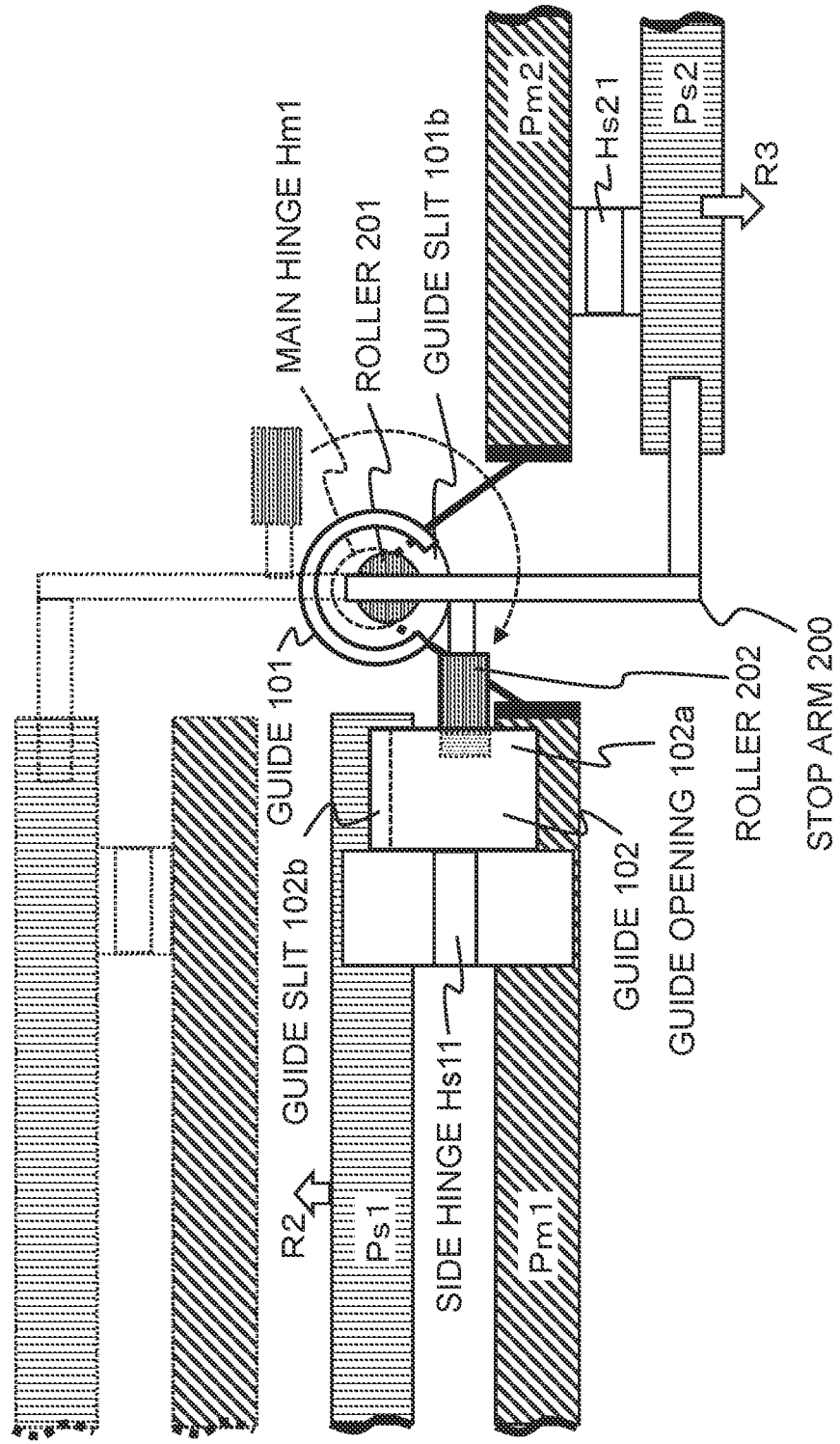
FIG. 7 is a partially enlarged plan view for explaining a basic operation of the panel deployment apparatus according to the present embodiment.

As shown in FIG. 7, it is assumed that the main panel Pm2 and the side panel Ps2 are latched when deployed at an angle of 180° by the rotation of the main hinge Hm1. When the main panel Pm2 and the side panel Ps2 start to deploy from the stowed position, the side panel Ps2 is urged in the deploying direction (indicated by arrow R3) by the side hinges Hs21 and Hs22 as described above. Similarly, the stop arm 200 also continues to be urged in the same developing direction, so that the roller 201 moves while rotating along the inner surface of the guide 101. As a result, as long as the roller 201 is engaged with the guide 101, the deployment of the side panel Ps2 is locked. When further rotated, the roller 201 reaches the guide slit 101b, passes through the guide slit 101b, and is disengaged from the guide 101.

In FIG. 7, the roller 202 is arranged such that the leading portion of the roller 202 is inserted into the guide opening 102a of the guide 102 before the main panel Pm2 and the side panel Ps2 are deployed by 180°. Accordingly, even if the roller 201 is disengaged from the guide 101, the roller 202 is in contact with the inner surface of the guide 102 and stops the movement of the stop arm 200 in the developing direction R3. Hereinafter, the operation of the panel deployment apparatus according to the present embodiment will be described in detail with reference to FIGS. 8 to 13.

3. Panel Deployment Operation

Figure 8:
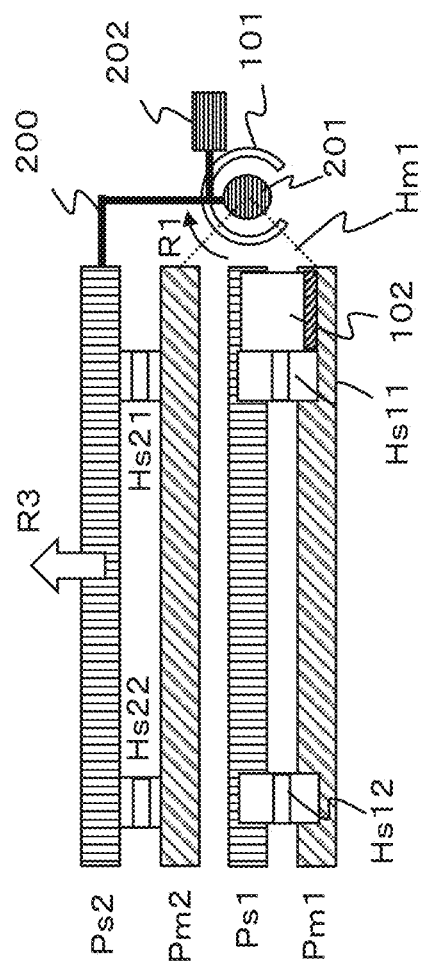
FIG. 8 is a schematic plan view of the panel deployment apparatus before the main panels are deployed, for explaining the panel deployment operation of the present embodiment.

As shown in FIG. 8, in the panel stack state, the main panel Pm2 is urged in the deploying direction R1 with respect to the main panel Pm1 by the main hinge Hm1, and the side panel Ps2 is urged by the side hinges Hs21 and Hs22 in the developing direction R3. However, since the roller 201 at the tip of the stop arm 200 is engaged with the guide 101, the deployment of the side panel Ps2 is suppressed. When the deployment of the main panel is started in this state, the main panel Pm2 and the side panel Ps2 are rotated about the main hinge Hm1 as shown in FIG. 9.

Figure 9:
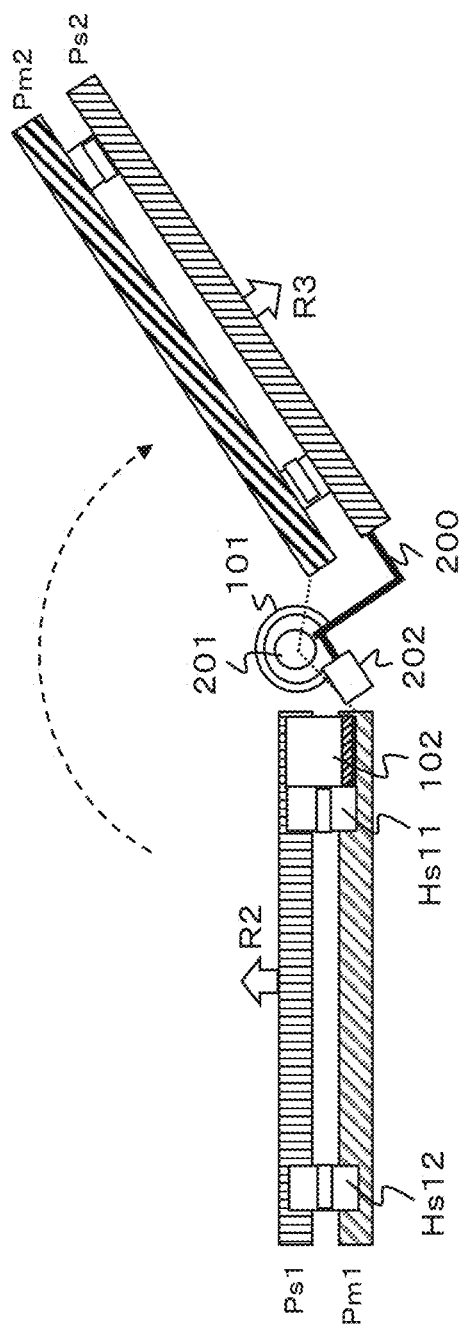
FIG. 9 is a schematic plan view of the panel deployment apparatus when the main panel is halfway deployed, for explaining the panel deployment operation of the present embodiment.

As shown in FIG. 9, even if the main panel Pm2 and the side panel Ps2 rotate, the deployment of the side panel Ps2 is suppressed as long as the roller 201 is engaged with the guide 101. Further, as described above, as long as the roller 211 is engaged with the guide 103, the development of the side panel Ps1 is suppressed. The roller 201 is engaged with the guide 101 until reaching the guide slit 101b of the guide 101, suppressing the deployment of the side panel Ps2. As described above, since the side panel Ps2 is urged by the side hinges Hs21 and Hs22 in the deploying direction (indicated by arrow R3), the stop arm 200 is also urged in the same deploying direction. Accordingly, the roller 201 moves while rotating along the inner surface of the guide 101 and reaches the guide slit 101b. However, before the roller 201 reaches the guide slit 101b and is disengaged from the guide 101, at least the leading portion of the roller 202 comes into the guide opening 102a of the guide 102.

Figure 10:
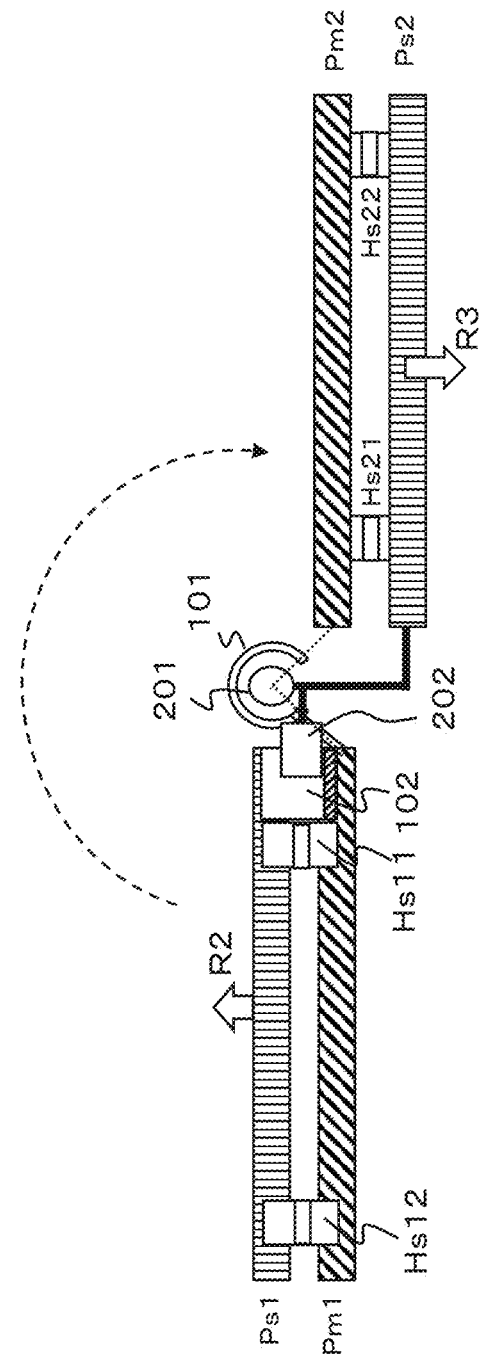
FIG. 10 is a schematic plan view of the panel deployment apparatus when the main panel is fully deployed, for explaining the panel deployment operation of the present embodiment.
Figure 11:
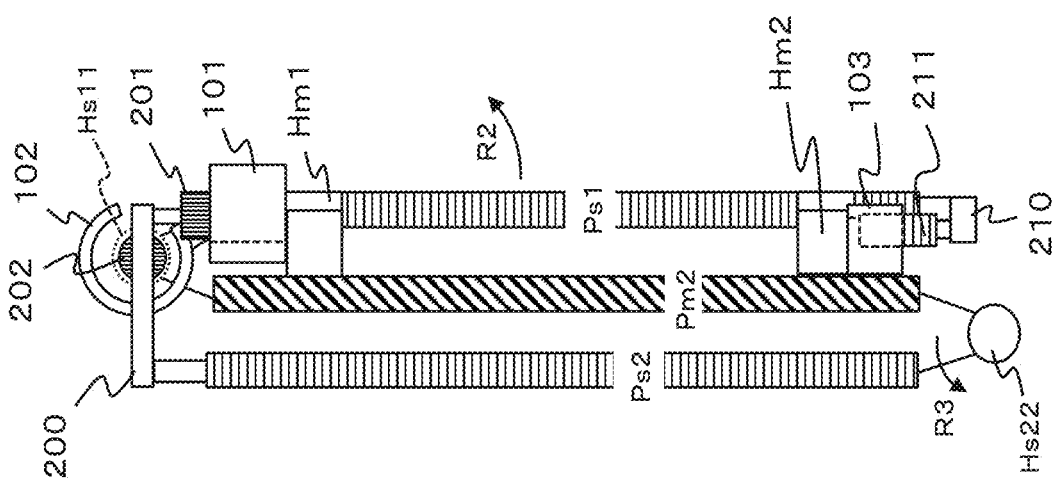
FIG. 11 is a schematic side view of the panel deployment apparatus at the full deployment as shown in FIG. 10.

As shown in FIGS. 10 and 11, when the main panel Pm2 and the side panel Ps2 are deployed by 180°, the roller 202 enters the guide opening 102a of the guide 102 to come into contact with the inner surface of the guide 102. This prevents the side panel Ps2 from deploying in the deployment direction R3 even if the roller 201 is disengaged with the guide 101.

As shown in FIG. 11, in a state where the main panel Pm2 and the side panel Ps2 are deployed by 180°, the roller 211 reaches the guide slit 103b of the guide 103 to be disengaged from the guide 103, so that the side panel Ps1 starts to rotate in the deploying direction R2 by the side hinges Hs11 and Hs12.

Figure 12:
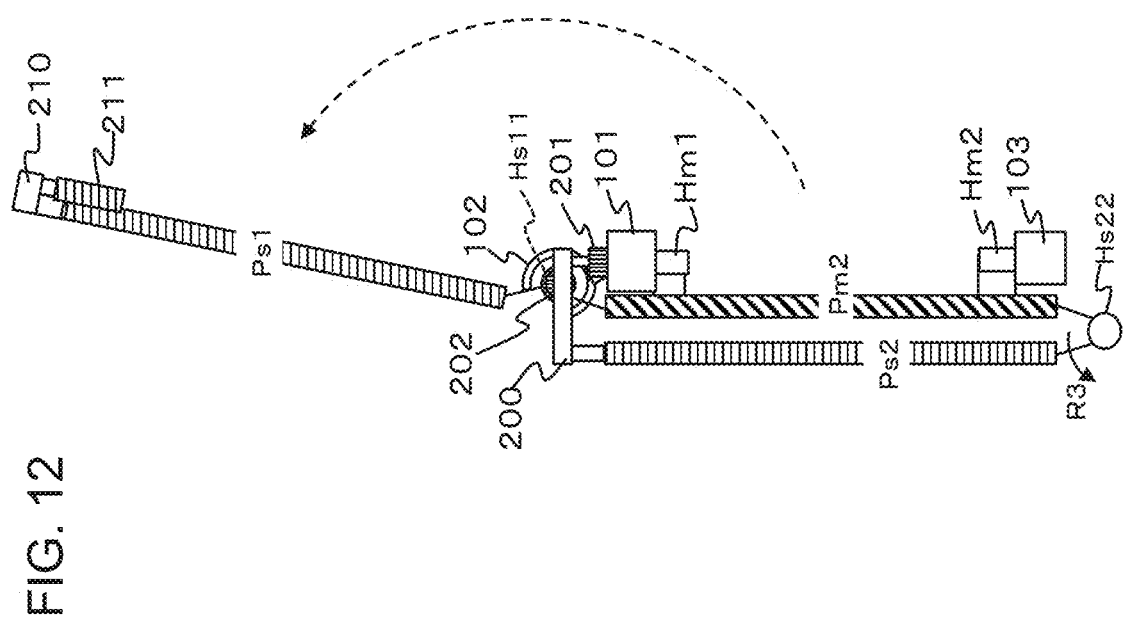
FIG. 12 is a schematic plan view of the panel deployment apparatus when the side panel is halfway deployed, for explaining the panel deployment operation of the present embodiment.

As shown in FIG. 12, when the side panel Ps1 rotates according to the rotation of the side hinge Hs11, the guide 102 rotates with respect to the roller 202. When the roller 202 reaches the guide slit 102b of the guide 102 at a desired deployment position, the roller 202 is disengaged from the guide 102.

Figure 13:
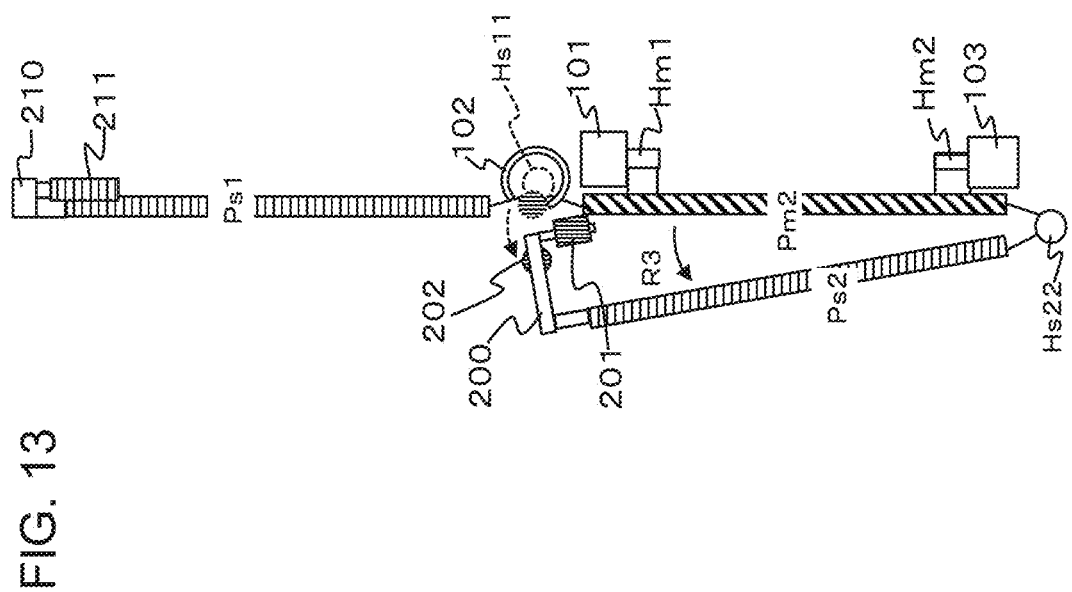
FIG. 13 is a schematic plan view of the panel deployment apparatus when the side panel is fully deployed, for explaining the panel deployment operation of the present embodiment.

As shown in FIG. 13, when the roller 202 reaches the guide slit 102b of the guide 102 and is disengaged from the guide 102, the stop arm 200 becomes in a state of not abutting on either of the guides 101 and 102. As a result, the side panel side Ps2 to be finally deployed starts to deploy in the arrow direction R3 by the hinges Hs21 and Hs22.

As described above, the panel deployment apparatus according to the present embodiment deploys the main panels Pm1 and Pm2 together with their respective side panels, whereby the stop means is changed from a combination of the roller 201 and the guide 101 to another combination of the roller 202 and the guide 102. Then, the deployment of the side panel Ps1 causes the roller 202 to be disengaged from the guide 102, thereby the side panel Ps2 to be finally deployed starting deployment. In this way, the main panel deployment and the side panel deployment can be controlled sequentially.

4. Other Exemplary Embodiments

In the above embodiment, the deployment mechanism of four panels is illustrated, but the present invention is not limited to this number of panels. By repeating the above-mentioned deployment mechanism, a plurality of panels can be separated into main panels and side panels, which are sequentially deployed.

Figure 14:
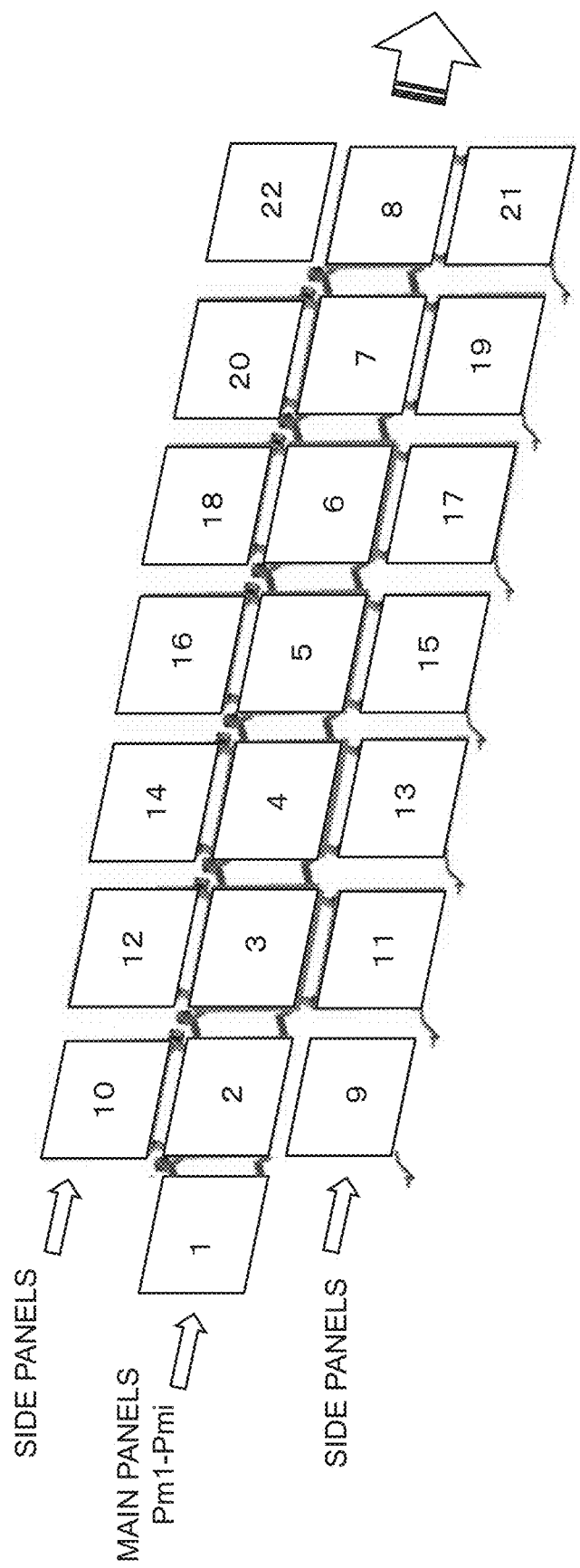
FIG. 14 is a panel development view for explaining a panel development operation of the panel development apparatus according to another exemplary embodiment of the present invention.

As shown in FIG. 14, for example, twenty-two panels can be sequentially deployed by the similar mechanism. The numerals on each panel in FIG. 14 indicate the order of deployment. By applying the deployment structure according to the present embodiment, the main panels 1-8 can be sequentially deployed and subsequently the side panels 9-22 can be sequentially deployed.

5. Effect

As described above, by adopting the exemplary embodiment of the present invention, it becomes possible to separate the main panel deployment and the side panel deployment and control the sequential deployment of side panels without a complicated synchronization mechanism. By applying this embodiment to a deployment mechanism of a solar cell paddle for an artificial satellite, which requires particularly lightweight and simple deployment control, it is possible to reduce mass and reduce deployment latch impact due to stable deployment behavior.

INDUSTRIAL APPLICABILITY

The present invention can be applied to the deployment mechanism of a solar cell paddle or a large antenna mounted on a spacecraft such as an artificial satellite.

REFERENCE SIGNS LIST

Pm1, Pm2 Main panel
Ps1, Ps2 Side panel
Hm1, Hm2 Main hinge
Hs11, Hs12, Hs21, Hs22 Side hinge
31 First arm
32 Second arm
33 Deployment spring
34 Guide
34a Guide opening
34b Guide slit
101, 102, 103 Guide
101a, 102a, 103a Guide opening
101b, 102b, 103b Guide slit
200, 210 Stop arm
201, 202, 211 Roller
301 Hinge shaft support
302 Bearing
303 Mount portion
304 Hinge shaft
305 Latch mechanism
306 Mount portion

The invention claimed is:

1. A panel deployment apparatus that sequentially deploys a plurality of panels arranged in a stacked state before deployment, comprising:
   a main hinge that couples a first main panel and a second main panel such that they are deployable about a first hinge axis;
   a first side hinge that couples the first main panel and a first side panel such that they are deployable about a second hinge axis orthogonal to the first hinge axis;
   a second side hinge that couples the second main panel and a second side panel such that they are deployable about a third hinge axis opposite to the first side hinge;
   a first guide provided on the first hinge axis of the main hinge, the first guide being fixed to the first main panel;
   a second guide provided on the second hinge axis of the side hinge, the second guide being fixed to the first side panel; and
   a deployment stop member that stops deployment of the second side panel by sequential engagement with the first guide and the second guide, the deployment stop member being fixed to the second side panel,
   wherein the second main panel and the second side panel are deployed in a state of the deployment stop member being engaged with the first guide and, when the deployment stop member is disengaged from the first guide, the second side panel is deployed with respect to the second main panel.

2. The panel deployment apparatus according to claim 1, wherein the deployment stop member comprises:
   a first stop member arranged that the first stop member can be engaged with the first guide, the first stop member extending in a direction of the first hinge axis;
   a second stop member arranged that the second stop member can be engaged with the second guide, the first stop member extending in a direction of the second hinge axis, wherein
   the second main panel is deployed by rotation of the main hinge in a state of the first stop member being engaged with the first guide and, when the first stop member of the deployment stop member is disengaged from the first guide, the second stop member is engaged with the second guide, thereby maintaining a stop state of deployment of the second side panel with respect to the second main panel,
   the first side panel is deployed with respect to the first main panel by rotation of the first hinge in a state of the second stop member being engaged with the second guide and, when the second stop member of the deployment stop is disengaged from the second guide, the second side panel is deployed with respect to the second main panel.

3. The panel deployment apparatus according to claim 1 or 2, wherein
   the first guide is fixed to an arm of the main hinge on the main panel side and has a first cylindrical member centered about the first hinge axis, the first cylindrical member having a first slit opening formed in a part of a side surface of the first cylindrical member, wherein the first stop member is disengaged from the first guide means through the first opening,
   the second guide is fixed to an arm of the first side hinge on the first side panel side and has a second cylindrical member centered about the second hinge axis, the second cylindrical member having a second slit opening formed in a part of a side surface of the second cylindrical member, wherein the second stop member is disengaged from the second guide through the second slit opening.

4. The panel deployment apparatus according to claim 3, wherein
   with respect to a first pair of the first main panel and the first side panel, a second pair of the second main panel and the second side panel is deployed by the main hinge in a state of the first stop member being engaged with the first cylindrical member of the first guide, causing the first stop member to move in the first cylindrical member,
   the second stop member reaches the second guide before the first stop member reaches a position of the first slit opening of the first guide,
   when the first stop member is disengaged from the first guide through the first opening, the second stop member is engaged with the second cylindrical member of the second guide by abutting the second cylindrical member,
   the first side panel of the first pair is deployed by the first hinge in a state of the second stop member being engaged with the second cylindrical member of the second guide, causing the second cylindrical member to rotate with respect to the second stop member,
   when the second slit opening of the second guide reaches a position of the second stop member, the second stop member is disengaged from the second guide through the second slit opening of the second guide, causing the second side panel coupled with the deployment stop member to be deployed with respect to the second main panel.

5. The panel deployment apparatus according to claim 1, further comprising:

a second main hinge that couples the first main panel and the second main panel such that they are deployable about the first hinge axis;

a third guide provided on the first hinge axis of the second main hinge, the third guide being fixed to the second main panel;

a second deployment stop member that stops deployment of the first side panel by engagement with the third guide, the second deployment stop member being fixed to the first side panel, wherein the second main panel and the second side panel are deployed in a state of the second deployment stop member being engaged with the third guide and, when the second deployment stop member is disengaged from the third guide, deployment of the first side panel is started with respect to the second main panel.

6. The panel deployment apparatus according to claim 1, wherein start timing of deployment of side panel is determined depending on a length of an engagement portion of the first guide and the second guide which the deployment stop member is engaged with.

7. A deployment structure comprising the panel deployment apparatus according to claim 1.

8. A solar cell paddle mounted on a space craft, comprising the panel deployment apparatus according to claim 1.

9. A panel deployment method for sequentially deploying a plurality of panels arranged in a stacked state before deployment in a panel deployment apparatus including:

a main hinge that couples a first main panel and a second main panel such that they are deployable about a first hinge axis;

a first side hinge that couples the first main panel and a first side panel such that they are deployable about a second hinge axis orthogonal to the first hinge axis;

a second side hinge that couples the second main panel and a second side panel such that they are deployable about a third hinge axis opposite to the first side hinge;

a first guide provided on the first hinge axis of the main hinge, the first guide being fixed to the first main panel;

a second guide provided on the second hinge axis of the hinge, the second guide being fixed to the first side panel; and a deployment stop member that stops deployment of the second side panel by sequential engagement with the first guide and the second guide, the deployment stop member being fixed to the second side panel, the panel deployment method comprising:

deploying the second main panel by rotation of the main hinge in a state of the deployment stop member being engaged with the first guide;

when the second main panel is deployed, disengaging the deployment stop member from the first guide, engaging the deployment stop member with the second guide, thereby maintaining a stop state of deployment of the second side panel with respect to the second main panel, when deploying the first side panel by rotation of the first side hinge in a state of the deployment stop member being engaged with the second guide, disengaging the deployment stop member from the second guide, causing the second side panel to be deployed with respect to the second main panel.

* * * * *